G. H. HILL.
SINGLE PHASE MOTOR CONTROL.
APPLICATION FILED SEPT. 13, 1907.
953,036.
Patented Mar. 29, 1910.
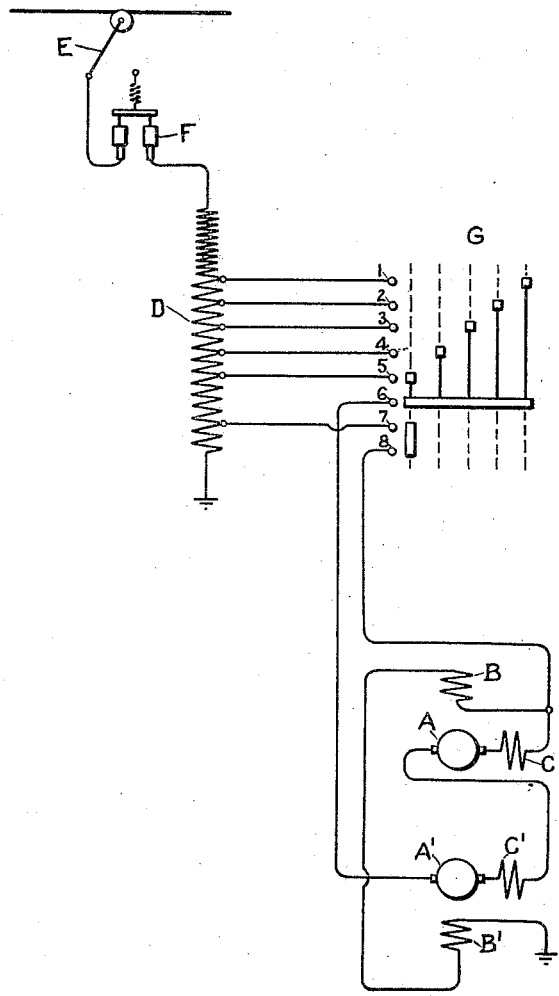
Witnesses:
Irving E. Steers.
J. Ellis Glen
Inventor
George H. Hill
by Albert H. Davis
Att'y.

UNITED STATES PATENT OFFICE.

GEORGE H. HILL, OF SCHENECTADY, NEW YORK, ASSIGNOR TO GENERAL ELECTRIC COMPANY, A CORPORATION OF NEW YORK.

SINGLE-PHASE-MOTOR CONTROL.

953,036.   Specification of Letters Patent.   Patented Mar. 29, 1910.

Application filed September 13, 1907. Serial No. 392,632.

*To all whom it may concern:*

Be it known that I, GEORGE H. HILL, a citizen of the United States, residing at Schenectady, county of Schenectady, State of New York, have invented certain new and useful Improvements in Single-Phase-Motor Control, of which the following is a specification.

My invention relates to single-phase commutator motors having series characteristics, such as the compensated series motor or the repulsion motor, and the object of my invention is to improve the starting characteristics, of such motors.

It is now well understood in the art that single-phase motors of the commutator type should have a comparatively weak field at starting, since otherwise excessive currents are induced in the armature coils short-circuited by the commutator brushes, which currents produce sparking as soon as the armature begins to move. These short-circuit currents, in addition to producing bad commutation at starting, have another effect which I believe has not heretofore been recognized. The short-circuited coils act like the secondary of a transformer, of which the field winding forms the primary. In a transformer, as is well known, the flux is not in phase with either the primary or the secondary current, but is in phase with the resultant of these two. Similarly, in the motor the currents in the short-circuited armature coils, reacting on the field flux which produces them, shift the phase of this flux so that it is no longer in phase with the field-current. Therefore, if the field current at starting is in phase with the armature current, as is the case in a series motor, and as is approximately the case in a repulsion motor, the field-flux is thrown out of phase with the armature-current, so that the starting torque is lowered. This injurious effect of the short-circuit armature currents can not be remedied by reducing the field-strength. By my invention I employ a novel arrangement of starting connections whereby the field-flux is fixed in phase with the armature current.

My invention consists in the method of operating a single-phase motor of the commutator type, which consists in impressing on the field winding at starting a voltage fixed in amount and phase, and as soon as the motor has started, changing the connections so that the currents in field and armature are kept in phase, regardless of the phase relations of their terminal voltages. The fixed voltage impressed on the field terminals insures that the field-flux shall be exactly ninety degrees out of phase with the impressed voltage, regardless of the reaction of the short-circuit currents in the armature coils. Consequently, by properly selecting the phase of the voltage impressed on the field terminals, the field-flux may be fixed in phase with the armature-current. As soon as the armature starts, the electromotive forces induced in the short-circuited armature coils by rotation reduce the amount of the short-circuited currents, so that the normal operating connections may be established. Since the self-induction of the armature, even in a compensated series motor or in a repulsion motor, is high compared with the ohmic resistance, perfect compensation being impossible because of magnetic leakage, the armature current at starting lags nearly ninety degrees behind the impressed voltage. Consequently, the voltage impresed on the field winding at starting may be in phase with the voltage impressed on the armature, or, in other words, the field and the armature may be connected in shunt. Accordingly, my invention, more specifically stated, consists in the method of operating a single-phase motor of the commutator type, which consists in connecting it as a shunt motor at starting, and when it has started, changing the connections to those of a series or repulsion motor, so as to cause it to operate with series characteristics.

My invention further comprises a novel arrangement of the controlling switch for such motors adapted to facilitate the practice of the method above described.

My invention will best be understood by reference to the accompanying drawing, which shows diagramatically a pair of compensated series motors arranged to be controlled in accordance with my invention.

In the drawing, A A′ represent the armatures, B B' the field or exciting windings, and C C' the compensating windings of two compensated series motors.

D represents a transformer winding serving as a source of supply for the motors. One terminal of the transformer is earthed and the other is connected to the trolley E through the circuit-breaker F.

G represents the controlling switch for the motors having stationary contact fingers numbered 1 to 8, and movable contacts coöperating therewith.

For the sake of simplicity the reversing switch for the motors is omitted from the drawing.

When the switch G is moved to its first position a circuit is established from the transformer D through contact fingers 5 and 6, armature A', compensating winding C', armature A, and compensating winding C, to contact 8, and thence through contact 7 to transformer D. The compensating and armature windings are thus connected in series across the portion of the transformer winding between points connected to contacts 5 and 7. The lower terminal of field winding B is also connected to contacts 8 and 7, while the upper terminal of field winding B' is earthed. The two field windings are consequently connected across the portion of the transformer between contact 7 and ground, that is, the field windings are connected through the transformer in shunt to the other motor windings. The voltage across the terminals of the field windings is fixed by these connections, and consequently the field flux of the motors is fixed both in amount and in phase. This flux is ninety degrees behind the impressed voltage, and is consequently at the instant of starting approximately in phase with the armature currents in the motors, which are also at starting lagged nearly ninety degrees behind the terminal voltage. In moving switch G to its second position the connection of contact 6 is shifted from contact 5 to contact 4, so as to increase the voltage impressed on the motors, and at the same time the connection from the junction of the field winding B and compensating winding C to the transformer is broken at contacts 7 and 8. This leaves all three windings of both motors connected in series. In other words, the normal running connections for compensated series motors are established. With these connections the field-current is necessarily in phase with the armature-current, regardless of the phase relations of the terminal voltages, which, of course, remain no longer in phase after the motors have started and counter-electromotive forces are generated in the armatures which tend to bring the armature terminal voltages and current into phase. In its movement through its subsequent positions, switch G simply increases the voltage impressed on the motors without further change in the motor connections.

I do not desire to limit myself to the particular connections and arrangement of parts here shown, but aim in the appended claims to cover all modifications which are within the scope of my invention.

What I claim as new and desire to secure by Letters Patent of the United States, is:

1. The method of operating a single-phase motor of the commutator type which consists in so connecting the field and armature windings at starting that the voltage at the terminals of both windings are fixed and in phase, and as soon as the motor has started changing the connections so that the currents through said windings are kept in phase regardless of the phase relations of their terminal voltages.

2. The method of operating a single-phase motor of the commutator type which consists in connecting it as a shunt motor at starting and when it has started changing the connections to cause it to operate with series characteristics.

3. The method of operating a single-phase motor of the commutator type which consists in connecting the field and armature in shunt at starting and in series as soon as the motor has started.

4. The method of operating a single-phase series motor of the commutator type supplied through a transformer which consists in connecting the motor terminals to the transformer and establishing a connection from the point of connection between field and armature to an intermediate point on the transformer so as to connect field and armature in shunt through the transformer at starting, and opening said connection as soon as the motor is started.

5. In combination, a single-phase motor of the commutator type having series characteristics in normal operation, a source of current therefor, and a controlling switch arranged in its first position to connect the motor to the source as a shunt motor and in its subsequent positions to establish normal running connections.

6. In combination, a single-phase motor of the commutator type, a source of current therefor, and a controlling switch arranged in its first position to connect the motor to the source as a shunt motor and in subsequent positions to connect the motor to the source as a series motor.

7. In combination, a single-phase series motor of the commutator type, a transformer for supplying current thereto, and a controlling switch arranged in its starting position to establish a connection from the point of connection of armature and field to an intermediate point on the transformer and in moving to subsequent positions to break said connection.

8. In combination, a single-phase motor having an armature winding provided with a commutator, a compensating winding, and a field or exciting winding, a source of current for the motor, and a controlling switch arranged in its first position to connect the motor to the source with the field winding in parallel with the other two windings and in its subsequent positions to connect the field in series with the other windings.

In witness whereof, I have hereunto set my hand this 11th day of September, 1907.

GEORGE H. HILL.

Witnesses:
BENJAMIN B. HULL,
BERTHA SECOR.